UNITED STATES PATENT OFFICE.

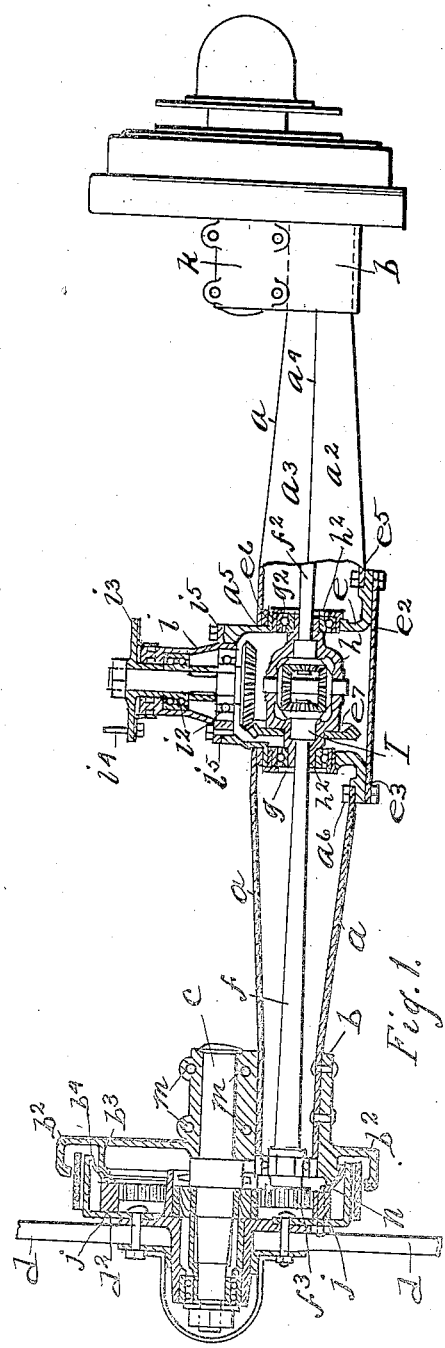
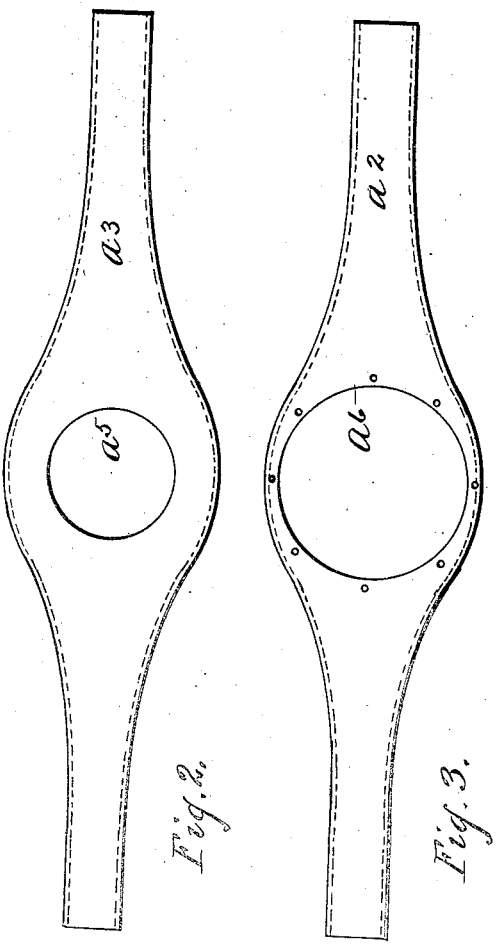
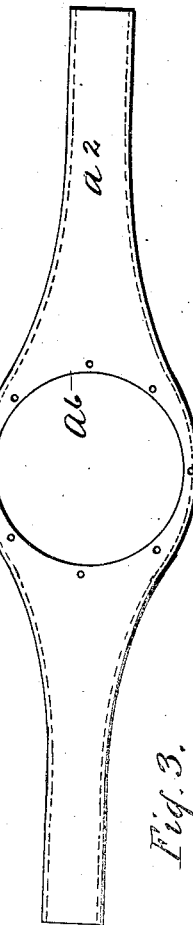

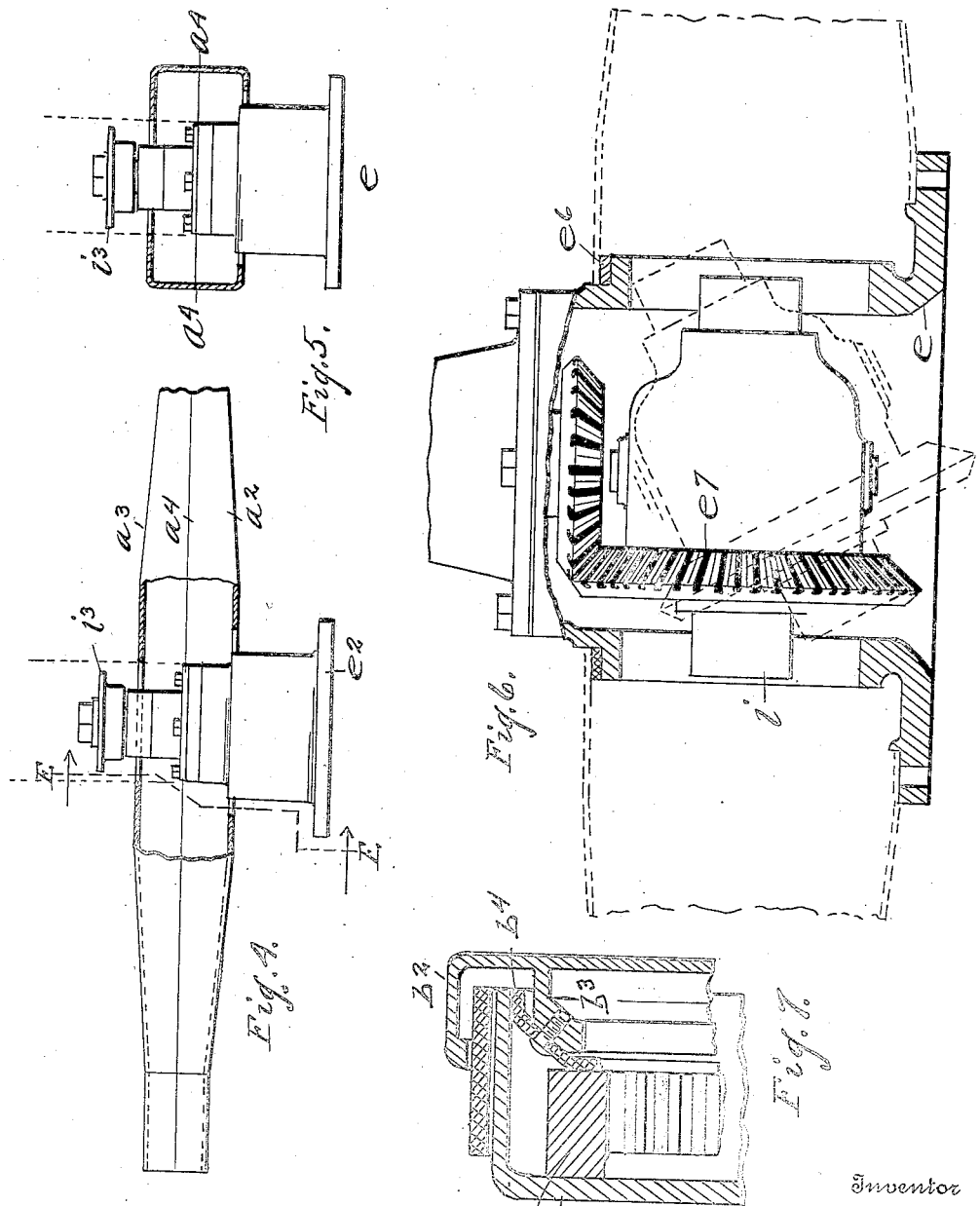

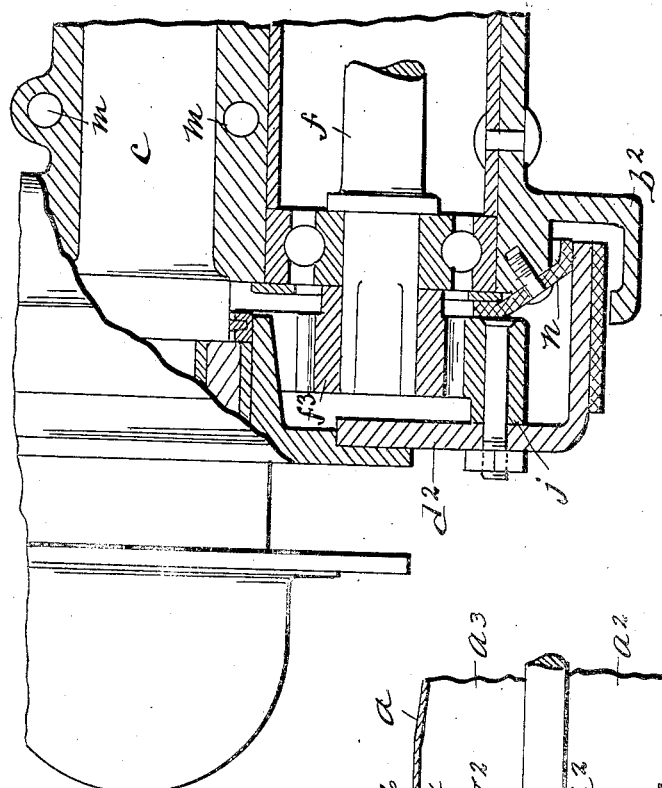
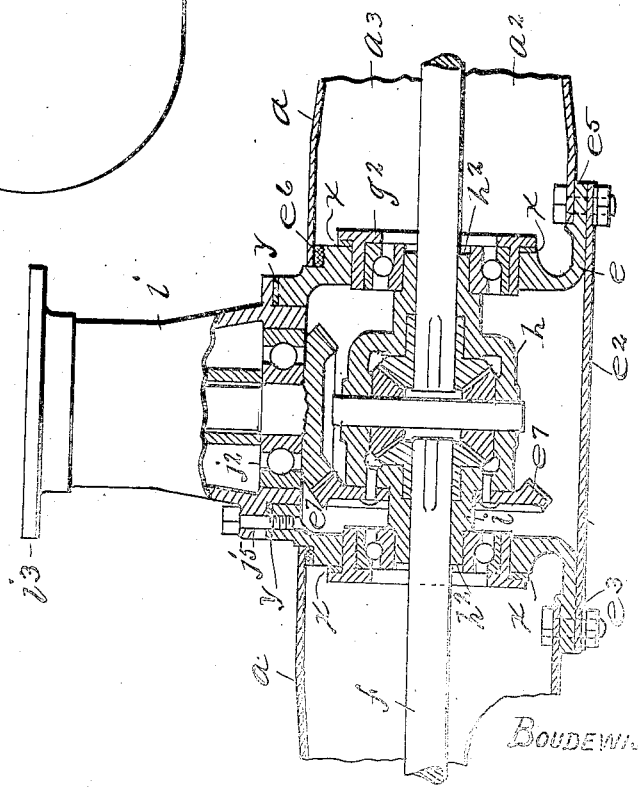

BOUDEWIJN B. NEUTEBOOM, OF DETROIT, MICHIGAN.

AXLE CONSTRUCTION.

1,331,662.  Specification of Letters Patent.  Patented Feb. 24, 1920.

Application filed May 14, 1917. Serial No. 168,375.

*To all whom it may concern:*

Be it known that I, BOUDEWIJN B. NEUTEBOOM, a subject of the Queen of the Netherlands, residing at Detroit, county of Wayne, State of Michigan, have invented a certain new and useful Improvement in Axle Construction, and declare the following to be a full, clear, and exact description of the same, such as will enable others skilled in the art to which it pertains to make and use the same, reference being had to the accompanying drawings, which form a part of this specification.

My invention relates to axle constructions and a special object of my improvements is to provide an improved axle for motor trucks that may be cheaply made, readily adjusted, the parts readily accessible, and which shall be strong and well adapted to the use for which it is intended.

I attain this object in the device illustrated in the accompanying drawings in which:

Figure 1 is a plan view partly in section of an axle construction embodying my invention.

Fig. 2 is the forward and

Fig. 3 is the rear portion of the casing.

Fig. 4 is a detail plan view partly in section of the center portion of the casing with the differential housing partly removed.

Fig. 5 is a section on the line E—E Fig. 4 looking in the direction of the arrows.

Fig. 6 is a plan view partly in section of the differential housing and adjacent parts of the construction, the bearings for the differential spider being removed and the method of removing the spider from the housing indicated in dotted lines.

Fig. 7 is a detail sectional view showing parts to an enlarged scale.

Fig. 8 is a detail sectional view of the differential and casing to an enlarged scale.

Fig. 9 is a detail, partly in section, showing the construction at one end of the counter shaft to an enlarged scale.

$a$ is the casing for the counter-shaft or jack-shaft. This is made up of two halves $a^2$ and $a^3$ stamped from sheet metal and united at $a^4$ along their upper and lower edges by welding. The part $a^3$ has an opening $a^5$ at its center and the part $a^2$ has a larger opening $a^6$ in its wall. When the parts $a^2$ $a^3$ are united to form the casing $a$ the centers of the openings $a^5$ and $a^6$ are in line, $a^5$ being in the front wall of the casing and $a^6$ in the rear wall thereof. The casing $a$ is rigidly secured at each of its ends as by riveting to a casting $b$. Each end of said casing fits into an aperture in said casting. There is formed in each of the castings $b$ an aperture having its axis parallel to that which receives the end of the casing $a$. $c$ is a stub-shaft fitted tightly as by a driving fit into the aperture in the casting $b$ and preferably having its inner end upset as indicated in Fig. 1 and its axis extending parallel to the axis of the casing $a$. A wheel $d$ is fitted and adapted to turn on the outer end of the stub-shaft or spindle $c$.

$e$ is a differential housing of a cylindrical shape having a flange around its outer end at $e^5$ and a shoulder $e^6$ at its inner end. The cylindrical body of the housing $e$ passes through the opening $a^6$ in the rear wall of the casing $a$ and its flange $e^5$ fits and is bolted against the outer wall of said casing around the aperture $a^6$. The inner cylindrical end of the housing $e$ fits and bears against the walls of the aperture $a^5$ in the inner wall of the housing $a$. A washer of suitable compressible material is placed between the shoulder $e^6$ and the inner wall of the casing $a$ and when the bolts are tightened securing the housing in place said shoulder is pressed firmly against and compresses said washer so as to make a tight and firm joint. The rear end of the housing $e$ is open as shown at $e^2$ except when closed by a cover-plate $e^3$ which is secured in place by the bolts securing the housing in place. There are two coaxial openings $e^7$ in the sides of the housing $e$ and in these openings are placed two roller bearings $g$ and $g^2$. $h$ is a differential spider carrying the usual planetary gears. This spider rests in the bearings $g$ and $g^2$. $f$ and $f^2$ are the two portions of a divided jack-shaft, the inner ends of which removably engage the spider $h$ $h$ and the usual conical wheels in connection with which the planetary pinions of the differential act. Each of the parts of the jack-shaft $f$ $f^2$ is provided at its outer end with a pinion $f^3$ which engages an internally toothed gear wheel or rack $j$ bolted to the brake drum $d^2$ secured to the wheel $d$. $x$ $x$ are shims by which the ball bearings may be fixed in the desired relative positions.

$i$ is a casing carrying the ball bearings in which rests and is adapted to turn the inner end of the transmission shaft through which the differential gear is actuated in the usual way. This transmission shaft is provided at its outer ends with a flange $i^3$ upon which the main portion of the universal joint may be bolted by bolts $i^4$ in the usual way. $y$ is a shim by which the casing $i$ may be adjusted as to its relative position.

$k$ (Fig. 1) represent spring seats, one of which is upon each of the castings $b$.

The rear springs of the vehicle are secured by U-bolts in the usual way upon this seat.

$b^2$ is a drum formed with the casting $b$ concentric with the spindle $c$ and having a flange extending over the brake drum $d^2$. $b^3$ is an annular inwardly extending flange concentric to the drum $d^3$ and of smaller diameter than said drum and having its inner end formed to present a conical inwardly extending surface. $n$ is a band of leather or other suitable material shaped into a conical form and secured upon the conical inner surface of the flange $b^3$, its inner edge pressing against the side of the circular rack $j$ near the periphery thereof and its outer edge pressing against the inner surface of the brake drum $d^2$. The pressure upon each of these edges is sufficient to bend the band inward, as shown in Fig. 1, and form a tight joint which will exclude dust and keep the lubricant in.

In this construction the casing of the jack-shaft forms the resisting part of the axle and it is itself light, easily constructed and of a strength adapted to its purpose.

The stub axles or spindles $c$ are cheaply made and as fixed in the casting $b$ form a rigid and durable construction.

By releasing the bolts which secure the flange $e^5$ of the housing and withdrawing the parts $f$ $f^2$ from said housing the housing $e$ may be taken out at the rear of the casing $a$ and it may carry with it the entire transmission shaft and mechanism.

If it is desired to remove the differential spider $h$ this may be done when the bearing $g^2$ is removed by moving said spider sidewise and then turning it as indicated in dotted lines in Fig. 6, it may then be withdrawn as a whole from the opening $o^2$.

What I claim is:

1. In a self-propelled vehicle, a transversely extending driving shaft, a housing inclosing said driving shaft, a transmission shaft gearing with said driving shaft at one end and at the other end extending outside of said housing and terminating adjacent to the outer wall thereof, means for securing a universal joint upon the outer end of said transmission shaft, brackets on the outer end of said housing, stub axles fixed in said brackets eccentric to said housing and having their axes upon the same side of said housing as the protruding end of said transmission shaft and approximately in a plane through the axis of said housing and transmission shaft, a gear wheel on said driving shaft and a gear wheel mounted and adapted to turn on said stub shaft, said gear wheels engaging each other for the purpose described.

2. In an axle construction, a shaft housing having an opening through its outer and inner wall, a differential housing adapted to pass into said openings and be removed through one of said openings, a transversely-extending driving shaft, said shaft housing inclosing said driving shaft, a transmission shaft connected to said driving shaft at the end distant from the opening through which the differential housing may be removed, brackets on the outer ends of said shaft housing, stub axles fixed in said brackets eccentric to said housing and having a common axis approximately in the plane of the axis of said transmission shaft and housing.

3. In an axle construction, the combination of a casing having an opening through one of its walls, a differential housing adapted to fit in said opening and be secured to the walls surrounding the same, said housing being opened at its outer end and adapted to be closed by a cover-plate.

4. In an axle construction, a shaft casing having an opening in one of its walls, a differential housing adapted to pass into said opening, said housing having its outer end open, apertures in said housing adapted to receive the bearings for the differential spider, a differential spider adapted to fit in said bearings, said openings being of such a size and the differential spider being so shaped that the latter may be moved sidewise and withdrawn through the open outer end of said housing.

5. In an axle construction, a casing having an opening through its wall, a differential housing adapted to fit into said opening, said housing having its outer end open, a differential spider bearing in said housing, said housing being so constructed that the spider may be removed and inserted through its open end.

6. In an axle construction, a wheel provided with a surface perpendicular to the axis thereof, and a surface forming a part of a cylinder coaxial with said wheel, a stationary flange having a conical surface coaxial with said wheel, a conical washer secured to said conical surface and bearing against a surface in a plane perpendicular to the axis of said wheel and said cylindrical surface.

7. In a self-propelled vehicle, a transversely extending driving shaft, a housing therefor, brackets at the end of said housing secured to the same, stub axles fixed in said brackets eccentric to said housing and approximately in a horizontal plane through the axis thereof, and seats for attaching the springs on said brackets located vertically with reference to said stub axles.

In testimony whereof I sign this specification.

BOUDEWIJN B. NEUTEBOOM.